United States Patent
Koda et al.

(10) Patent No.: US 7,529,159 B2
(45) Date of Patent: May 5, 2009

(54) SYSTEM AND METHOD FOR RECORDING INFORMATION ONTO AN INFORMATION RECORDING MEDIUM'S FIRST AND SECOND RECORDING LAYERS

(75) Inventors: Takeshi Koda, Tokorozawa (JP); Keiji Katata, Tokorozawa (JP); Masayoshi Yoshida, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 382 days.

(21) Appl. No.: 10/585,254

(22) PCT Filed: Dec. 24, 2004

(86) PCT No.: PCT/JP2004/019295

§ 371 (c)(1),
(2), (4) Date: Jul. 5, 2006

(87) PCT Pub. No.: WO2005/066953

PCT Pub. Date: Jul. 21, 2005

(65) Prior Publication Data

US 2007/0128544 A1    Jun. 7, 2007

(30) Foreign Application Priority Data

Jan. 6, 2004    (JP)    ............................. 2004-001061

(51) Int. Cl.
G11B 21/08    (2006.01)
(52) U.S. Cl. ........................................ 369/30.1; 369/94
(58) Field of Classification Search ........................ None
See application file for complete search history.

(56) References Cited

U.S. PATENT DOCUMENTS 6,424,614 B1 *    7/2002    Kawamura et al. ........ 369/275.3

FOREIGN PATENT DOCUMENTS

| JP | 62-066491 | 3/1987 |
|----|-----------|--------|
| JP | 08-212561 | 8/1996 |
| JP | 09-069264 | 3/1997 |
| JP | 09-231613 | 9/1997 |
| JP | 09-259438 | 10/1997 |
| JP | 11-025608 | 1/1999 |
| JP | 2000-311346 | 11/2000 |

(Continued)

*Primary Examiner*—Paul Huber
(74) *Attorney, Agent, or Firm*—Young & Thompson

(57) ABSTRACT

There is provided an information recording device for recoding information onto an information recording medium including a first recording layer (L0 layer) having a first recording capacity and a second recording layer (L1 layer) having a second recording capacity. The information recording device includes: write means capable of writing information onto the first and the second recording layer; calculation means for calculating a loopback address used when recording information subsequently after the first recording layer and the second recording layer according to the all information amount and the first and the second recording capacity; and control means for controlling the write means so that (I) a first part of the information is written up to this loopback address (1AFFFFh) onto the first recording layer and (II) the remaining second part of the information is written, starting from the corresponding address (E50000h) of the second recording layer corresponding to the loopback address.

8 Claims, 8 Drawing Sheets

FOREIGN PATENT DOCUMENTS

| | | |
|---|---|---|
| JP | 2001-023237 | 1/2001 |
| JP | 2001-126255 | 5/2001 |
| JP | 2001-148166 | 5/2001 |
| JP | 2002-358660 | 12/2002 |
| JP | 2003-132630 | 5/2003 |
| JP | 2004-342217 | 12/2004 |

* cited by examiner

[FIG. 1]
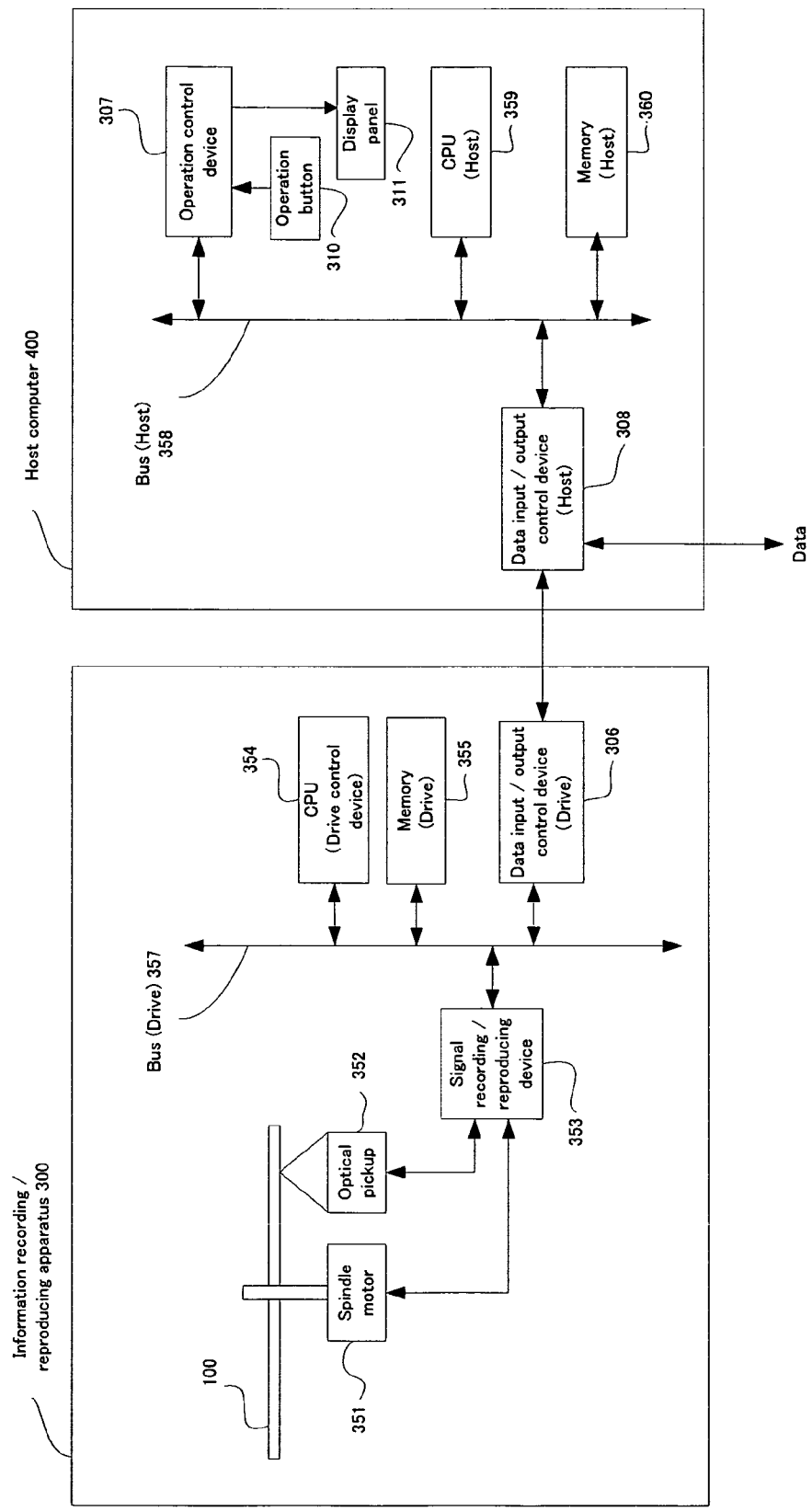

[FIG. 2]
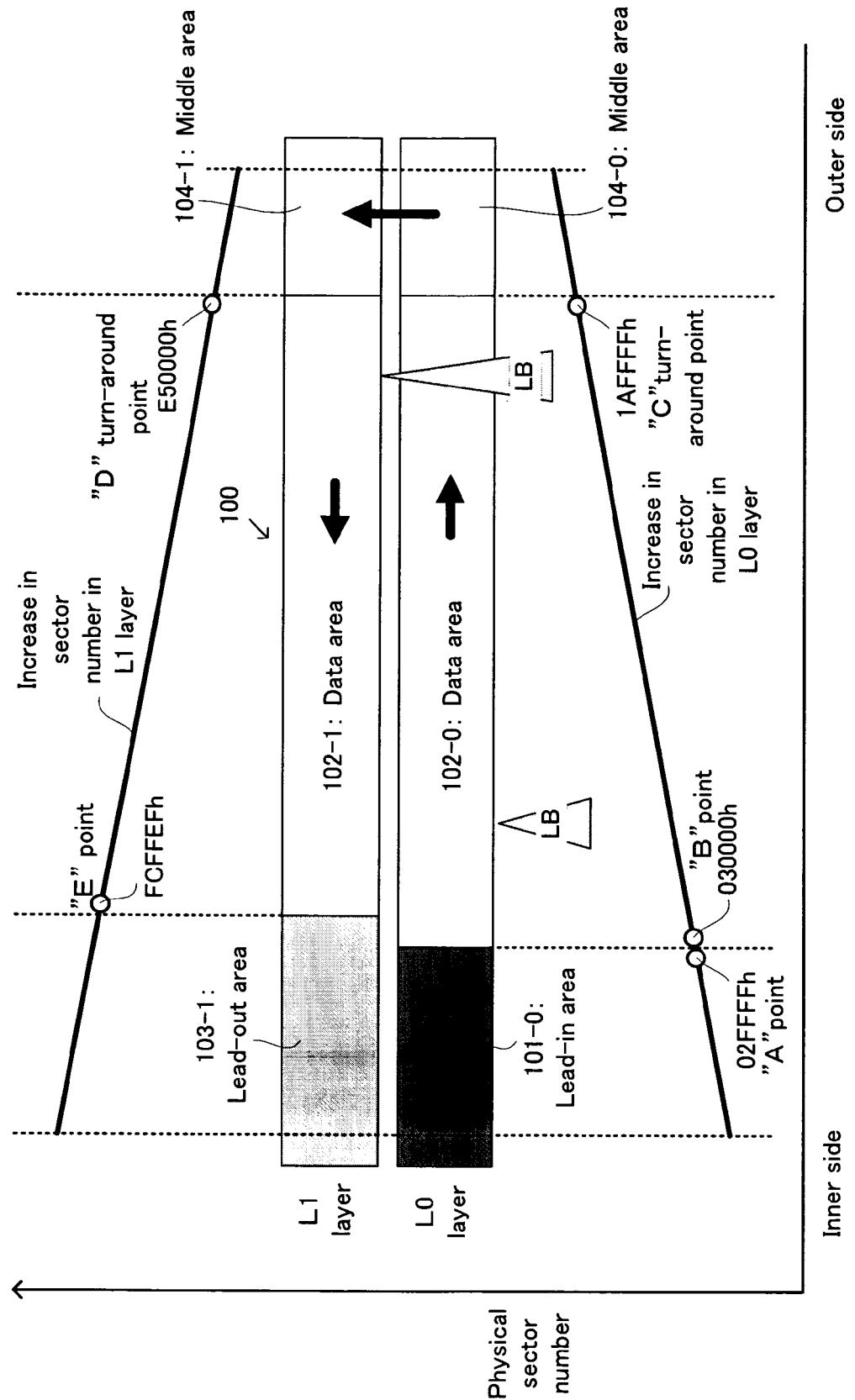

[FIG. 3]
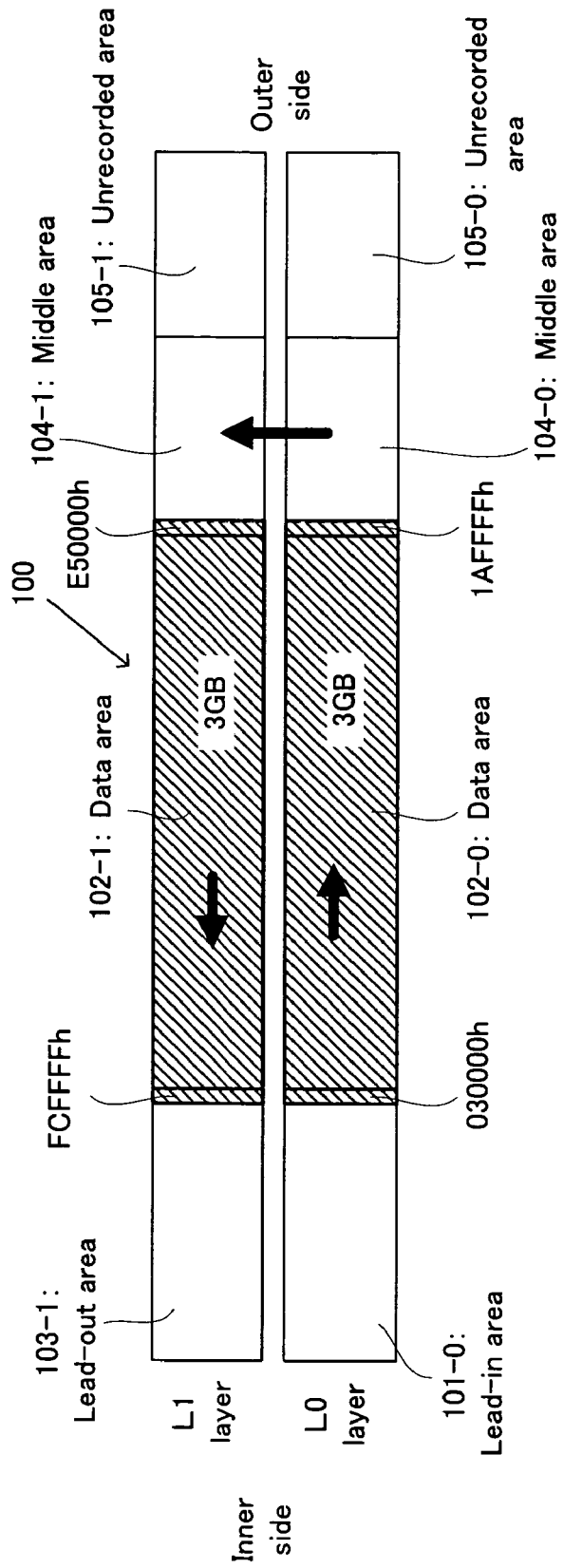

[FIG. 4]
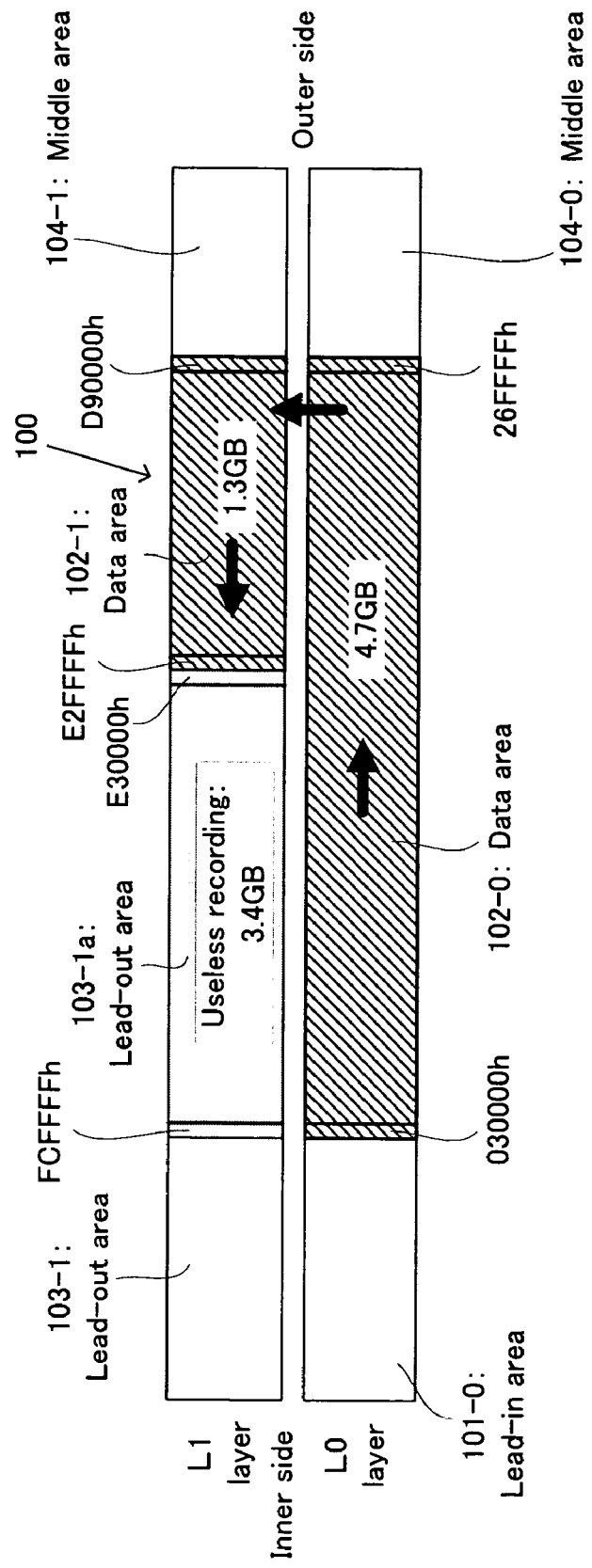

[FIG. 5]
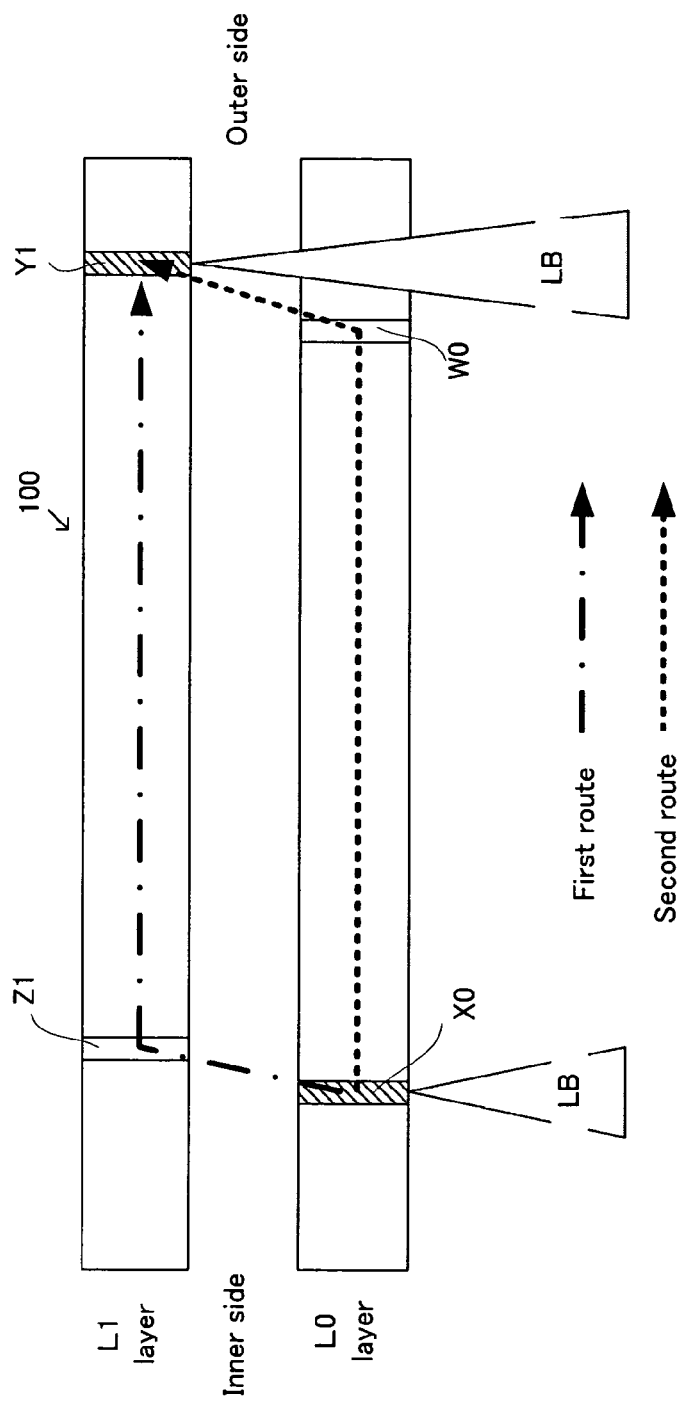

[FIG. 6]
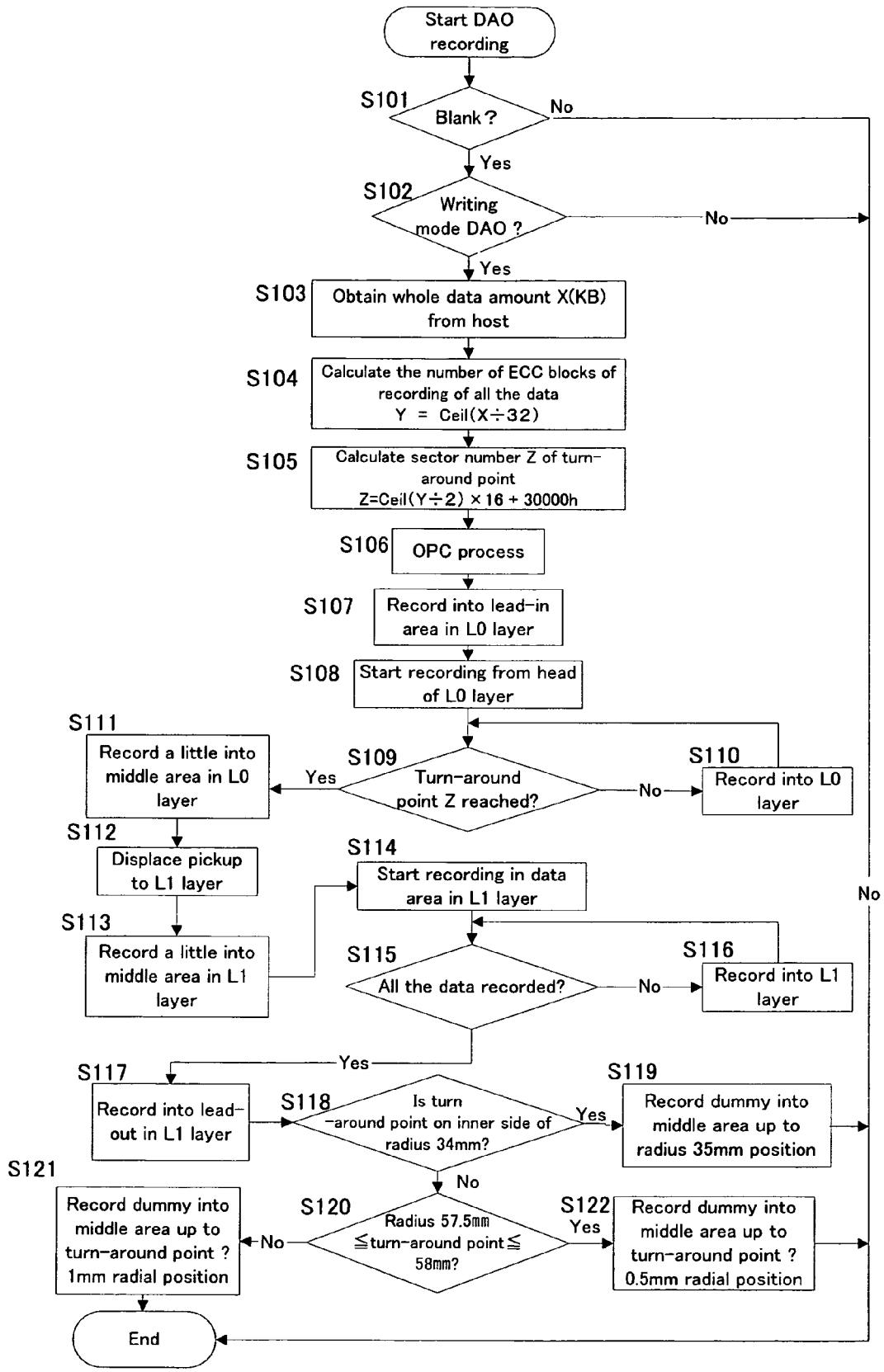

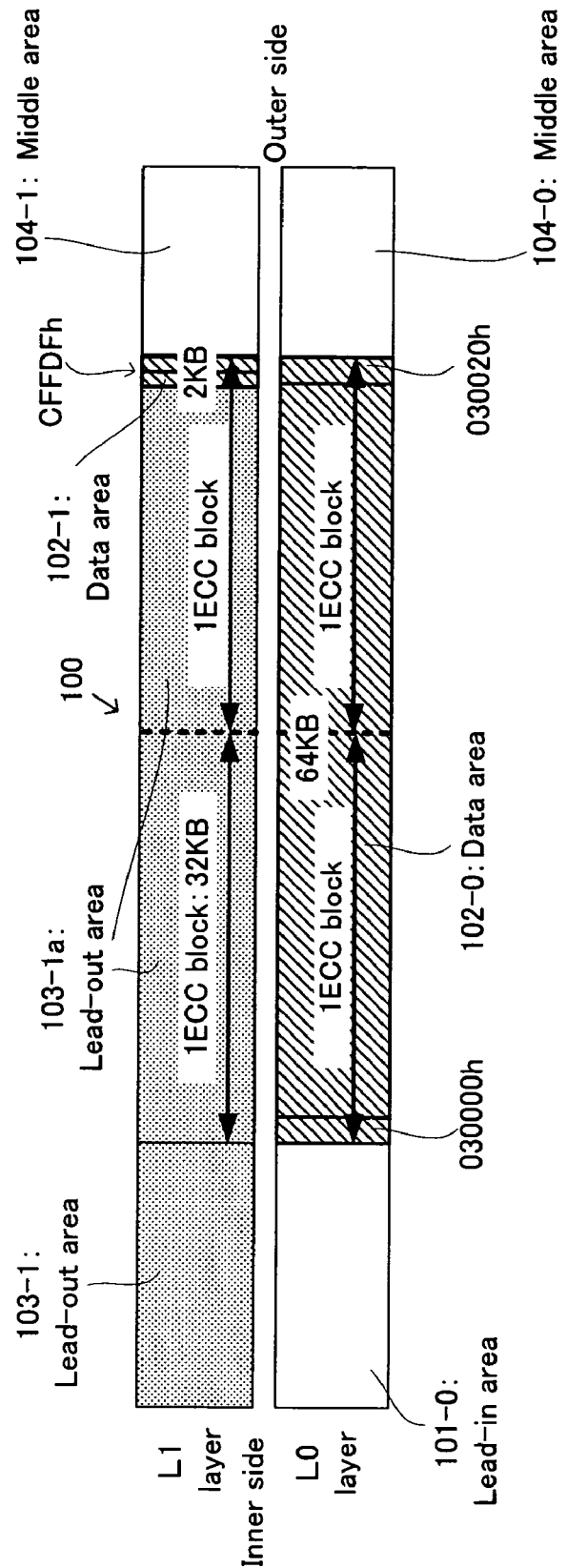
[FIG. 7]

[FIG. 8]
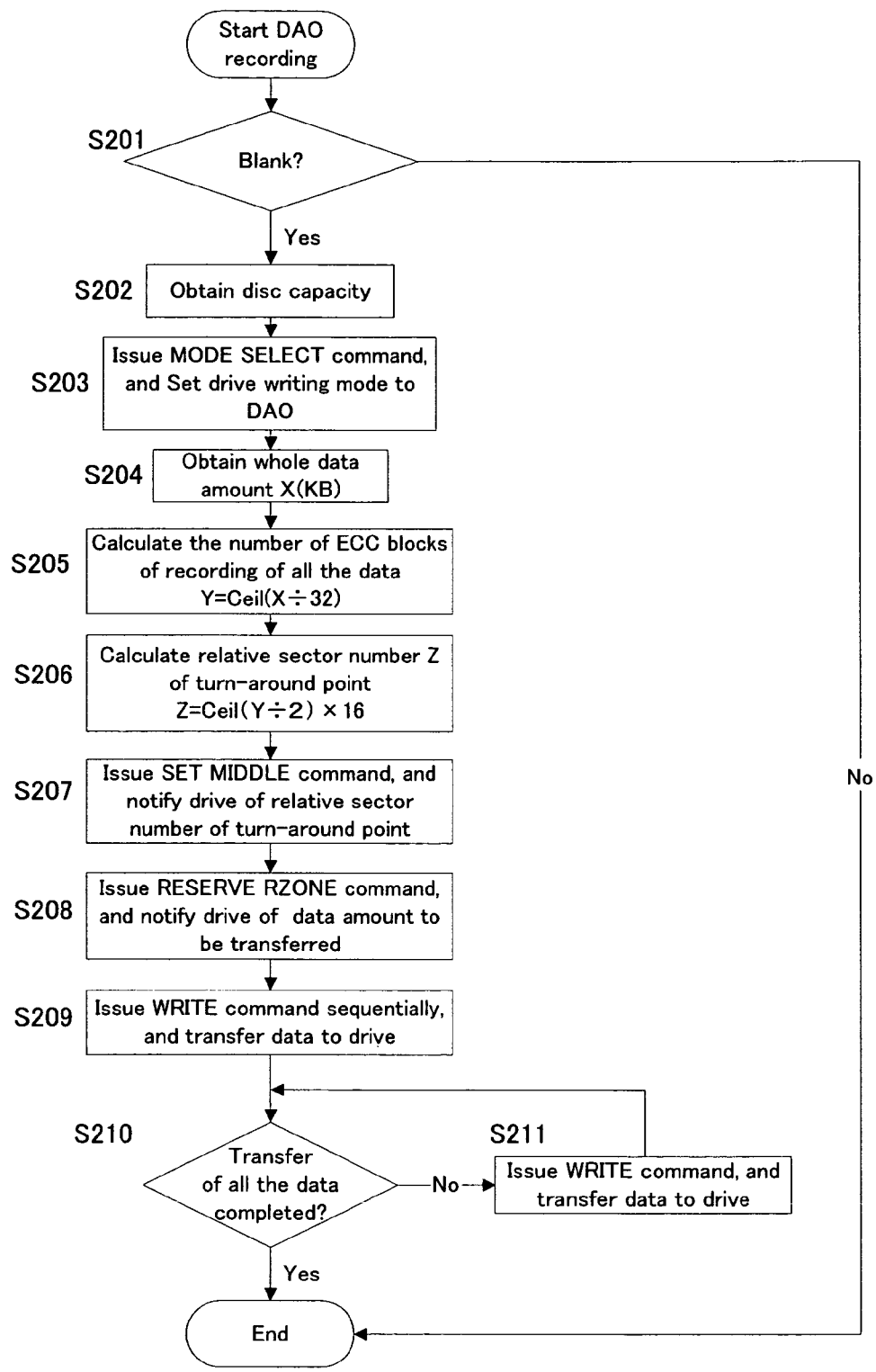

SYSTEM AND METHOD FOR RECORDING INFORMATION ONTO AN INFORMATION RECORDING MEDIUM'S FIRST AND SECOND RECORDING LAYERS

TECHNICAL FIELD

The present invention relates to an information recording apparatus, such as a DVD recorder, and an information recording method.

BACKGROUND ART

In an information recording medium, such as a CD and a DVD, for example, as described in patent documents 1 and 2 or the like, there is also developed an information recording medium, such as a multilayer type or dual layer type optical disc, in which a plurality of recording layers are provided on the same substrate. Then, on an information recording apparatus, such as a DVD recorder, for performing the recording with respect to the dual layer type, i.e., two-layer type, optical disc, laser light for recording is focused or condensed on a recording layer located on the front as viewed from the irradiation side of the laser light (hereinafter referred to as an "L0 layer", as occasion demands), to thereby record information into the L0 layer in an irreversible change recording method by heat or a rewritable method. Moreover, the laser light is focused or condensed on a recording layer located on the rear of the L0 layer as viewed from the irradiation side of the laser light (hereinafter referred to as an "L1 layer", as occasion demands), through the L0 layer or the like, to thereby record information into the L1 layer in the irreversible change recording method by heat or the rewritable method.

Moreover, there is also disclosed a technology of performing the recording in a DAO recording method with respect to the L0 layer and the L1 layer. Here, the DAO (Disk At Once) method is a method in which a controlling device, such as a CPU (Central Processing Unit), on a disc drive side or a host computer side, for example, gains an understanding of the entire amount of information to be recorded, before an actual recording operation, and the information to be recorded (defined as "record information" in this application) is continuously recorded onto the information recording medium from a lead-in area to a lead-out area by one recording operation. In particular, it is possible to realize the maintenance of compatibility with a DVD-VIDEO/ROM.

On the other hand, there is also disclosed a technology of performing the recording or reproduction in an "opposite method" or a "parallel method" with respect to the L0 layer and the L1 layer. The "opposite method" herein is a recording or reproduction method in which the directions of track paths are opposite between the two recording layers, for example. As opposed to this, the "parallel method" is a recording or reproduction method in which the directions of track paths are the same between the two recording layers, for example.

Incidentally, in the "opposite method", if the recording or reproduction is ended in the L0 layer, an optical pickup, located on the most outer circumference of the optical disc, does not have to be displaced to the most inner circumference again when the recording or reproduction is started in the L1 layer, and it is only necessary to change the focal distance from the L0 layer to the L1 layer. Thus, there is an advantage that a changing time from the L0 layer to the L1 layer is shorter than that in the parallel method. This is why the opposite method is adopted in the recording of large volumes of content information which requires continuous reproduction.

Patent document 1: Japanese Patent Application Laid Open NO. 2000-311346
Patent document 2: Japanese Patent Application Laid Open NO. 2001-23237
Patent document 3: Japanese Patent Application Laid Open NO. Hei 9-231613
Patent document 1: Japanese Patent Application Laid Open NO. 2002-358660
Patent document 5: Japanese Patent Application Laid Open NO. 2001-126255

DISCLOSURE OF INVENTION

Subject to be Solved by the Invention

However, in the DAO recording method and the opposite method, for example, if user data including content information or the like is recorded over the two layers of the L0 layer and the L1 layer, not only effective data, such as the user data, but also useless data, such as dummy data, for example, are recorded in an unrecorded area located on the inner circumferential side of the L1 layer. This is because a tracking servo in the layer focus jump (layer change) of the optical pickup is normally controlled at the time of reproduction operation of a general DVD-ROM drive, to thereby normally reproduce the user data. Therefore, there is such a technical problem that an actual recording time increases, by a recording time of the useless data, in addition to a recording time of the effective data, such as the content information.

In order to solve the above-mentioned conventional problems, it is therefore an object of the present invention to provide an information recording apparatus and an information recording method, in which information can be efficiently recorded in each recording layer of a multilayer type information recording medium and the recording time can be reduced.

MEANS FOR SOLVING THE SUBJECT

The above object of the present invention can be achieved by an information recording apparatus according to claim 1 of the present invention, which is an information recording apparatus for recording record information onto an information recording medium provided with: at least a first recoding layer having a first recording capacity; and a second recording layer having a second recording capacity, the information recording apparatus provided with: a writing device for writing the record information into the first recording layer and the second recording layer; a calculating device for calculating a turn-around address when the record information is recorded continuously into the first recording layer and the second recording layer, on the basis of an entire information amount of the record information and the first and second recording capacities; and a controlling device for controlling the writing device (I) to write a first portion of the record information into the first recording layer up to the calculated turn-around address and (II) to write a remaining second portion of the record information from a corresponding address in the second recording layer which corresponds to the calculated turn-around address in the first recording layer.

The above object of the present invention can be also achieved by an information recording method according to claim 6 of the present invention, which is an information recording method in an information recording apparatus provided with a writing device capable of writing record information into a first recording layer and a second recording layer on an information recording medium provided with: at least the first recoding layer having a first recording capacity; and the second recording layer having a second recording capacity, the information recording method provided with: a calculating process of calculating a turn-around address when the record information is recorded continuously into the first recording layer and the second recording layer, on the basis of an entire information amount of the record information and the first and second recording capacities; and a controlling process of controlling the writing device (I) to write a first portion of the record information into the first recording layer up to the calculated turn-around address and (II) to write a remaining second portion of the record information from a corresponding address in the second recording layer which corresponds to the calculated turn-around address in the first recording layer.

The above object of the present invention can be also achieved by an computer program according to claim 7 of the present invention, which is a computer program of instructions for recording control and for tangibly embodying a program of instructions executable by a computer provided in the information recording apparatus according to claim 1, to make the computer function as at least one portion of the writing device, the calculating device, and the controlling device.

These effects and other advantages of the present invention become more apparent from the following embodiments.

BEST MODE FOR CARRYING OUT THE INVENTION

Embodiment of Information Recording Apparatus

Hereinafter, the information recording apparatus in an embodiment of the present invention will be discussed.

The embodiment of the information recording apparatus of the present invention is an information recording apparatus for recording record information onto an information recording medium provided with: at least a first recoding layer having a first recording capacity; and a second recording layer having a second recording capacity, the information recording apparatus provided with: a writing device for writing the record information into the first recording layer and the second recording layer; a calculating device for calculating a turn-around address when the record information is recorded continuously into the first recording layer and the second recording layer, on the basis of an entire information amount of the record information and the first and second recording capacities; and a controlling device for controlling the writing device (I) to write a first portion of the record information into the first recording layer up to the calculated turn-around address and (II) to write a remaining second portion of the record information from a corresponding address in the second recording layer which corresponds to the calculated turn-around address in the first recording layer.

According to the embodiment of the information recording apparatus of the present invention, the information recording medium which is a target is a two-layer type or a multilayer type DVD or optical disc or the like on which the first and second recording layers are laminated or pasted on one side of a disc-shaped substrate, for example. In the first recording layer, the first portion of the record information, such as audio information, video information, or content information, for example, can be recorded along a first recording track path in which a groove (guidance groove) is formed. In the second recording layer, the second portion of the record information, such as audio information, video information, or content information, for example, can be recorded along a second track path in which a groove (guidance groove) is formed in the same manner.

In particular, the first recording track path is directed from one side to the other side, out of the inner circumferential side and the outer circumferential side of the disc-shaped substrate, while the second track path is directed from the other side to the one side. Namely, in the two-layer type or multi-layer type information recording medium, continuous recording can be performed in the "opposite method" in which the track paths are directed in the opposite direction between the two recording layers. Therefore, if the recording is continuously performed from the end edge of the first recording layer (e.g. the end portion on the outer circumferential side) to the start edge of the second recording layer (e.g. the end portion on the outer circumferential side), it is hardly necessary or not necessary at all to change the irradiation position of the laser light in the substrate surface in the radial direction, in changing the recording layer as the target of a recording process or reproduction process related to the record information. Thus, it is possible to perform quick layer jump (i.e. a layer changing operation). This is extremely useful in practice, in the point that it facilitates uninterrupted reproduction without a special buffer function to change the recording layer, when the record information, such as a movie, for example, is recorded as the continuous first and second portions.

Hereinafter, a detailed explanation will be given to the operation of the information recording apparatus, which performs the recording operation of the information recording medium constructed as described above.

At first, the calculating device, such as a CPU of the information recording apparatus or a host computer, calculates the turn-around point on the first recording track path in turning around from the first recording track path to the second track path, in the case where the first portion with an information amount less than the first recording capacity out of the record information is written into the first recording layer along the first recording track path, and the second portion with an information amount less than the second recording capacity is written along the second track path, on the basis of the entire information amount of the record information and the first and second recording capacities, which is known before the recording operation, for example.

Then, under the control of the controlling device, such as a CPU, for example, the writing device, such as an optical pickup, for writing the record information into the first and second recording layers writes the first portion of the record information into the first recording layer up to the calculated turn-around address along the first recording track path, and writes the second portion of the record information into the second recording layer along the second track path from the corresponding address in the second recording layer, which corresponds to the calculated turn-around address in the first recording layer. Here, the address related to the turn-around address and the corresponding address may be a physical sector number or a logical block address. Moreover, one specific example of a correspondence relationship between the turn-around address in the first recording layer and the corresponding address in the second recording layer is a complement number relationship in the physical sector number. More specifically, it is a relationship between "0011" and "1100" in binary numerals. Alternatively, as another specific example, it is an inverse proportional relationship in the logical block address. More specifically, it is a relationship of "Y"=constant−"X", wherein "X" is the turn-around address in the first recording layer and "Y" is the corresponding address in the second recording layer.

Therefore, under the control of the controlling device, the writing device can record the first and second portions on the one side, which is, for example, a centered side or the inner circumferential side of the disc-shaped substrate in the first and second recording layers. Thus, the recording time is only a time length for recording the record information, such as the content information, i.e., effective information for a user, which allows efficient reduction of the recording time. In other words, it is no longer necessary to uselessly record the dummy data, such as "0" or "Null", for example, described later.

Specifically, if the record information including 6 (GB) (GB: Giga Bytes)) content information is recorded in the DAO recording method and the opposite method, for example, the information amount of the first portion is calculated as 3 (GB) and the information amount of the second portion is calculated as 3 (GB). Then, more specifically, in the first recording layer, the recording is performed by 3 (GB) from a recording start address on the inner circumferential side "030000h" to a turn-around address located on the outer circumferential side "1AFFFFh". Incidentally, in the specification of this application, "h" at the end of "30000h" or the like indicates that the numbers in front of "h" are expressed by hexadecimal numeral. Then, the writing device, such as the optical pickup, is focused onto the second recording layer from the first recording layer, and the recording is performed in the second recording layer by 3 (GB) from a corresponding address "E50000h" located on the outer circumferential side to a recording end position "FCFFFFh" on the inner circumferential side. Then, lastly, recording for a finalize process is performed in buffer areas, for example, of the first and second recording layers.

As described above, the recording time is only a time length for recording the record information, such as the content information, i.e., the effective information for a user.

If the recording is performed maximally in the first recording layer having the first recording capacity without calculating the turn-around address, for example, if the record information including the content information or the like is recorded over the two layers of the first recording layer and the second recording layer, it is desirable to record not only this record information, but also the useless data, such as the dummy data, for example, into an unrecorded area located on the inner circumferential side of the second recording layer. That is because a signal-less area should not exist in order that a tracking servo is normally controlled in an area which is a destination of the layer focus jump (layer change) performed by the reading device, such as the optical pickup, at the time of reproduction operation of a general DVD-ROM drive, and that all the effective information recorded in the recording layer which is the destination of the jump is normally accessed. Therefore, if the effective data to be recorded does not satisfy the second recording capacity which is the maximum capacity of the second recording layer, it is necessary to record some useless information, such as the dummy data, into a remaining space area. Therefore, an actual recording time increases, by a recording time of the useless data, in addition to a recording time of the record information.

More specifically, if user data including 6 (GB) of content information is recorded in the DAO recording method and the opposite method, the record information is recorded maximally, by the first recording capacity of the first recording layer, e.g., 4.7 (GB), and the remaining record information which is not recorded in the first recording layer is recorded by 1.3 (GB) out of the second recording capacity of the second recording layer. In addition, it is necessary to perform the recording by 3.4 (GB) which is unrecorded out of the second recording capacity of the second recording layer. Thus, in the end, although the data amount of the record information is 6 (GB), it is necessary to record the total of the first recording capacity of the first recording layer and the second recording capacity of the second recording layer, for example, 4.7+4.7=9.4 (GB). For example, a recording time by 1 time speed defined by DVD Forum is about 1 hour and 54 minutes, which is longer than 1 hour and 12 minutes based on the present invention which is described later by the amount of the dummy data to be recorded.

In contrast, in the information recording apparatus of the present invention, it is possible to normally control the tracking servo of the writing device, such as the optical pickup. At the same time, as described above, the recording time is only a time length for recording the record information. Thus, the recording time by 1 time speed (1385 (KB/sec)) is about 1 hour and 12 minutes (=6 (GB)÷1385 (KB/sec)), which allows reduction of about 37% (about 40 min) from the case where the useless information is recorded, so that it is extremely useful.

In one aspect of the embodiment of the information recording apparatus of the present invention, the calculating device calculates the turn-around address such that an information amount of the second portion is equal to or less than an information amount of the first portion.

According to this aspect, there can be the address in the first recording layer corresponding to the end edge of the recording in the second portion in the second recording layer, which allows an efficient recording or reproduction operation for the first and second portions recorded in the first and second recording layers.

In another aspect of the embodiment of the information recording apparatus of the present invention, the writing device is constructed to write the record information by a predetermined recording unit, and the calculating device calculates the turn-around address such that each of the first portion and the second portion is a multiple of the predetermined recording unit.

According to this aspect, the writing device is constructed to write the record information by the predetermined recording unit. The predetermined recording unit herein is an ECC block or sector. More specifically, the ECC block (Error Correcting Code block) is a unit of data amount by which data errors can be detected and corrected. Incidentally, in the case of a DVD, 1 ECC block is 32 KB (=16 sectors). Then, the turn-around address is calculated by the calculating device such that each of the first portion and the second portion is a multiple of the predetermined recording unit, which is the ECC block, for example. Thus, the writing of the first portion can be performed by this each ECC block, at least in the first recording layer.

Thus, particularly, in a DVD-R, it is possible to maintain compatibility with a ROM disc. Incidentally, the sector unit allows more detailed calculation of the turn-around address and the corresponding address, and allows the efficient use of the recording capacities of the first and second recording layers.

In another aspect of the embodiment of the information recording apparatus of the present invention, the calculating device calculates the turn-around address only if the entire information amount of the record information is greater than the first recording capacity.

According to this aspect, under the control of the controlling device, such as a CPU, it is possible to record the record information, by using at least the first recording capacity of the first recording layer out of the first and second recording layers, more efficiently.

In another aspect of the embodiment of the information recording apparatus of the present invention, the information recording apparatus is further provided with a communicating device, which is communicably connected to a host computer for providing the record information, and into which firmware logically constituting the calculating device is incorporated, and the writing device and the controlling device obtain the record information from the host computer through the communicating device.

According to this aspect, by virtue of the firmware, it is possible to construct the calculating device and the communicating device, relatively easily, and also it is possible to speed up the calculation and communication processes. The firmware herein is software incorporated to perform the basic control of hardware, is installed fixedly in equipment, and is not changed basically. However, it can be also changed afterward for function addition and failure correction. The firmware is halfway concept between the software and the hardware. Specifically, the firmware is installed in personal computers, surrounding equipment, appliance products or the like, and it is stored in a ROM or a flush memory built in the equipment. More specifically, the BIOS (Basic Input/Output System) of the personal computer is also one example of the firmware.

Embodiment of Information Recording Method

Hereinafter, the information recording method in an embodiment of the present invention will be discussed.

The embodiment of the information recording method of the present invention is an information recording method in an information recording apparatus provided with a writing device capable of writing record information into a first recording layer and a second recording layer on an information recording medium provided with: at least the first recoding layer having a first recording capacity; and the second recording layer having a second recording capacity, the information recording method provided with: a calculating process of calculating a turn-around address when the record information is recorded continuously into the first recording layer and the second recording layer, on the basis of an entire information amount of the record information and the first and second recording capacities; and a controlling process of controlling the writing device (I) to write a first portion of the record information into the first recording layer up to the calculated turn-around address and (II) to write a remaining second portion of the record information from a corresponding address in the second recording layer which corresponds to the calculated turn-around address in the first recording layer.

According to the embodiment of the information recording method of the present invention, as in the case of the embodiment of the information recording apparatus of the present invention, under the control of the controlling device, the writing device can record the first and second portions, with it centered on the one side, which is, for example, the inner circumferential side of the disc-shaped substrate, in the first and second recording layers. Thus, the recording time is only a time length for recording the record information, such as the content information, i.e., the effective information, which allows efficient reduction.

Incidentally, the embodiment of the information recording method of the present invention can adopt the same various aspects as those of the embodiment of the information recording apparatus of the present invention described above.

Embodiment of Computer Program

The computer program in an embodiment of the present invention will be discussed hereinafter.

The embodiment of the computer program of the present invention is a computer program of instructions for recording control and for tangibly embodying a program of instructions executable by a computer provided in the above-mentioned embodiment of the information recording apparatus of the present invention (including its various aspects), to make the computer function as at least one portion of the writing device, the calculating device, and the controlling device.

According to the embodiment of the computer program of the present invention, the above-mentioned embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the embodiment of the information recording apparatus of the present invention described above, the embodiment of the computer program of the present invention can also adopt various aspects.

An embodiment of a computer program product of the present invention is a computer program product in a computer-readable medium for tangibly embodying a program of instructions executable by a computer provided in the above-mentioned embodiment of the information recording apparatus of the present invention (including its various aspects), to make the computer function as at least one portion of the writing device, the calculating device, and the controlling device.

According to the embodiment of the computer program product of the present invention, at least one portion of the writing device, the calculating device, and the controlling device can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one portion of the writing device, the calculating device, and the controlling device These effects and other advantages of the present invention become more apparent from the following examples.

As explained above, according to the embodiment of the information recording apparatus or method of the present invention, it is provided with: the writing device, the calculating device or process; the controlling device or process, so that it is possible to realize efficient reduction in the recording time. Moreover, according to the embodiment of the computer program of the present invention, it can make a computer function as the above-mentioned embodiment of the information recording apparatus of the present invention, so that it is possible to realize efficient reduction in the recording time.

BRIEF DESCRIPTION OF DRAWINGS

FIG. 1 is a block diagram showing an information recording/reproducing apparatus in an example of the information recording apparatus of the present invention, and a host computer.

FIG. 2 is a conceptual graph showing a relationship among an outline of operation in an opposite method of the information recording/reproducing apparatus in the example, the data structure of a two-layer type optical disc, and a physical sector number in the recording area of the optical disc.

FIG. 3 is a schematic data structure diagram showing one specific example of the data structure of the two-layer type optical disc on which recording is performed by the information recording/reproducing apparatus in the example.

FIG. 4 is a schematic data structure diagram showing one specific example of the data structure of the two-layer type optical disc on which recording is performed by an information recording/reproducing apparatus in a comparison example.

FIG. 5 is a schematic conceptual view showing routes when a general information recording/reproducing apparatus, such as a DVD-ROM drive, accesses a desired sector number on the two-layer type optical disc.

FIG. 6 is a flowchart showing a flow of recording operation of the optical disc, on the information recording/reproducing apparatus, particularly or e.g., a drive, in the example of the information recording apparatus of the present invention.

FIG. 7 is a schematic diagram showing one specific example in which the sector number of a turn-around point is calculated by the information recording/reproducing apparatus in the example of the information recording apparatus of the present invention.

FIG. 8 is a flowchart showing a flow of transfer operation of the optical disc, on the information recording/reproducing apparatus in the example of the information recording apparatus, particularly or e.g., the host, of the present invention.

DESCRIPTION OF REFERENCE CODES

100 . . . optical disc, 101-0 (101-1) . . . lead-in area, 102-0 (102-1) . . . data zone, 103-0 (103-1 or 103-1a) . . . lead-out area, 104-0 (104-1) . . . middle area, 105-0 (105-1) . . . unrecorded area, 300 . . . information recording/reproducing apparatus, 306 (308) . . . data input/output control device, 307 . . . operation control device, 310 . . . operation button, 311 . . . display panel, 351 . . . spindle motor, 352 . . . optical pickup, 353 . . . signal recording/reproducing device, 354 . . . CPU (drive control device), 355 (360) . . . memory, 359 . . . CPU (for host), 400 . . . host computer, LB . . . laserlight

EXAMPLE

Example of Information Recording Apparatus

Next, with reference to FIG. 1 to FIG. 8, the structure and the operation of an example of the information recording apparatus of the present invention will be discussed. In particular, in the example, the information recording apparatus of the present invention is applied to an information recording/reproducing apparatus for an optical disc.

At first, with reference to FIG. 1, an explanation will be given to the structures of an information recording/reproducing apparatus 300 in the example according to the information recording apparatus of the present invention, and a host computer 400. FIG. 1 is a block diagram showing the information recording/reproducing apparatus in the example of the information recording/reproducing apparatus of the present invention, and a host computer. Incidentally, the information recording/reproducing apparatus 300 has a function of recording the record data onto an optical disc 100 and a function of reproducing the record data recorded on the optical disc 100.

With reference to FIG. 1, the inner structure of the information recording/reproducing apparatus 300 will be discussed. The information recording/reproducing apparatus 300 is an apparatus for recording the information onto the optical disc 100 and reading the information recorded on the optical disc 100, under the control of a CPU (Central Processing Unit) 354 for a drive.

The information recording/reproducing apparatus 300 is provided with: the optical disc 100; a spindle motor 351; an optical pickup 352; a signal recording/reproducing device 353; the CPU (drive control device) 354; a memory 355; a data input/output control device 306; and a bus 357. Moreover, the host computer 400 is provided with: a CPU 359; a memory 360; an operation control device 307; an operation button 310; a display panel 311; and a data input/output control device 308.

In particular, the communicating device of the present invention may be constructed by including the information recording/reproducing apparatus 300 and the host computer 400 in the same package or case, or from the CPU (drive control device) 354, the data input/output control device 306, and the bus 357.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is to perform the recording/reproduction with respect to the optical disc 100, and is provided with a semiconductor laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls and the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser located in the optical pickup 352. The head amplifier amplifies the output signal of the optical pickup 352, i.e. the reflective light of the light beam, and outputs the amplified signal. More specifically, the signal recording/reproducing device 353 drives the not-illustrated semiconductor laser located in the optical pickup 352, in order to determine an optimum laser power by the recording and reproduction processes for an OPC (Optimum Power Calibration) pattern, together with a not-illustrated timing generator or the like, under the control of the CPU 354, at the time of an OPC process. In particular, the signal recording/reproducing device 353 constitutes one example of the "writing device" of the present invention, together with the optical pickup 352.

The memory 355 is used in the whole data processing and the OPC process or the like on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire information recording/reproducing apparatus 300 by giving an instruction to various controlling devices. Normally, software or firmware for operating the CPU 354 is stored in the memory 355. In particular, the CPU 354 constitutes one example of the "controlling device" and the "calculating device" of the present invention.

The data input/output control device 306 controls the input/output of the data from the exterior with respect to the information recording/reproducing apparatus 300, to thereby perform storage to and export from the data buffer on the memory 355. A drive control command issued from the external host computer 400 (hereinafter referred to as a "host", as occasion demands) connected to the information recording/reproducing apparatus 300 through an interface, such as a SCSI and an ATAPI, is transmitted to the CPU 354 through the data input/output control device 306. Moreover, the record/reproduction data is also transmitted and received with respect to the host computer 400 through the data input/output control device 306, in the same manner.

The operation control device 307 receives an operation instruction and performs display with respect to the host computer 400, and transmits an instruction by the operation button 310, such as an instruction to record or reproduce, to the CPU 359. The CPU 359 transmits a control command to the information recording/reproducing apparatus 300, through the data input/output control device 308, on the basis of instruction information from the operation control device 307, to thereby control the entire information recording/reproducing apparatus 300. In the same manner, the CPU 359 can transmit a command for requesting the information recording/reproducing apparatus 300 to transmit an operational state to the host, with respect to the information recording/reproducing apparatus 300. By this, the operational state of the information recording/reproducing apparatus 300, such as during recording and during reproduction, can be recognized, so that the CPU 359 can output the operational state of the information recording/reproducing apparatus 300 to the display panel 311, such as a fluorescent tube and an LCD, through the operation control device 307.

One specific example used by combining the information recording/reproducing apparatus 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 360, on the CPU 359. Moreover, in another specific example, the information recording/reproducing apparatus 300 is a disc drive (hereinafter referred to as a "drive", as occasion demands), and the host computer 400 is a personal computer and a work station. The host computer, such as the personal computer, and the drive are connected through the data input/output control devices 306 and 308, such as the SCSI and the ATAPI, and application, such as writing software, installed in the host computer controls the disc drive.

Next, with reference to FIG. 2, an explanation will be given to a relationship among an outline of operation in the opposite method of the information recording/reproducing apparatus in the example according to the information recording apparatus of the present invention, the data structure of a two-layer type optical disc, and a physical sector number in the recording area of the optical disc. Here, the physical sector number (hereinafter referred to as a sector number, as occasion demands) is position information which indicates an absolute physical address in the recording area of the optical disc. FIG. 2 is a conceptual graph showing a relationship among the outline of operation in the opposite method of the information recording/reproducing apparatus in the example, the data structure of the two-layer type optical disc, and the physical sector number in the recording area of the optical disc. The vertical axis indicates the sector number by hexadecimal numeral, and the horizontal axis indicates a relative position in the radial direction of the optical disc.

As shown in FIG. 2, the optical disc 100 in the example is provided with: a not-illustrated substrate; and two recording layers laminated or pasted on the substrate, i.e. an L0 layer and an L1 layer.

Specifically, the L0 layer is provided with: a lead-in area 101-0; a data area 102-0; and a middle area 104-0, from the inner to the outer circumferential side. On the inner circumferential side of the lead-in area 101-0, a not-illustrated OPC area or the like is provided.

On the other hand, the L1 layer is provided with: a middle area 104-1; a data area 102-1; and a lead-out area 103-1, which is one example of the "lead-out area" of the present invention, from the outer to the inner circumferential side. On the inner circumferential side of the lead-out area 103-1, a not-illustrated OPC area or the like is also provided.

The optical disc 100 is constructed in the above manner, so that laser light LB is irradiated from the side of the not-illustrated substrate, i.e., from the lower to the upper side in FIG. 2, by a not-illustrated optical pickup or the like of the information recording/reproducing apparatus in the example, and the focal distance thereof or the like is controlled. At the same time, the travel distance and direction in the radial direction of the optical disc 100 are controlled. By this, the data is recorded into each recording layer, or the recorded data is reproduced if the information recording/reproducing apparatus functions as an information reproducing apparatus.

In particular, the opposite method is adopted in the data recording or reproduction operation performed by the information recording/reproducing apparatus in the example. The opposite manner herein is such a manner that the optical pickup is displaced from the inner to the outer circumferential side, i.e. in a direction of a right-pointing arrow in FIG. 2, in the L0 layer, by the recording or reproduction operation of the information recording/reproducing apparatus, while the optical pickup is displaced from the outer to the inner circumferential side, i.e. in a direction of a left-pointing arrow in FIG. 2, in the L1 layer.

In the opposite manner, if the recording or reproduction is ended in the L0 layer, the optical pickup, located on the most outer circumference of the optical disc, does not have to be displaced again to the most inner circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel manner.

Specifically, at first, in the L0 layer, as the optical pickup is displaced in the lead-in area 101-0, the data area 102-0, and the middle area 104-0, from the inner to the outer circumferential side, the sector number in the recording area of the optical disc 100 increases. More specifically, the optical pickup sequentially accesses the end position of the lead-in area 101-0 with a sector number of "02FFFFh" (refer to an A point in FIG. 2), the start position of the data area 102-0 with a sector number of "030000h" (refer to a B point in FIG. 2), and the end position of the data area 102-0 with a sector number of "1AFFFFh" (hereinafter referred to as a "turn-around point" in the L0 layer, as occasion demands: refer to a C point in FIG. 2), and the optical pickup is displaced to the middle area 104-0 which functions as the buffer.

On the other hand, in the L1 layer, specifically, as the optical pickup is displaced in the middle area 104-1, the data area 102-1, and the lead-out area 103-1 from the outer to the inner circumferential side, the sector number in the recording area of the optical disc 100 increases. More specifically, the optical pickup sequentially accesses the middle area 104-1 which functions as the buffer, the start position of the data area 102-1 with a sector number of "E50000h" (hereinafter referred to as a "turn-around point" in the L1 layer, as occasion demands: refer to a D point in FIG. 2), which constitutes one example of the "corresponding address" of the present invention, and the end position of the data area 102-1 with a sector number of "FCFFEFh" (refer to an E point in FIG. 2), and the optical pickup is displaced to the lead-out area 103-1.

All the sector numbers in the L0 layer and the L1 layer explained above have a 15's complement number relationship in the hexadecimal numeral. More specifically, the turn-around point in the L0 layer (the sector number of "1AFFFFh") and the turn-around point in the L1 layer (the sector number of "E50000h") have the 15's complement number relationship. As a formal matter, the complement number of the "1AFFFFh" is obtained by converting the sector number of "1AFFFFh" in the hexadecimal numeral to a binary number of "000110101111111111111111", inverting the bits to "111001010000000000000000", and reconverting it to the "E50000h" in the hexadecimal numeral.

Thus, the content information is recorded or reproduced at the same time that the optical pickup is continuously displaced, in the sector numbers of "030000h" to "1AFFFFh" of the data area 102-0 in the L0 layer and the sector numbers of "E50000h" to "FCFFEFh" of the data area 102-1 in the L1 layer, for example.

Next, with reference to FIG. 3, an explanation will be given to one specific example of the data structure of the two-layer type optical disc on which the recording is performed by the information recording/reproducing apparatus in the example according to the information recording apparatus of the present invention. FIG. 3 is a schematic data structure diagram showing one specific example of the data structure of the two-layer type optical disc on which the recording is performed by the information recording/reproducing apparatus in the example.

As shown in FIG. 3, in the example, particularly in the DAO recording method, the amount of information recorded before the recording operation is known. Thus, under the control of the CPU or the like for the drive or the host, a portion of the information amount (e.g. 3 (GB) (GB: Giga Bytes)) less than the recording capacity of the L0 layer out of the record information is written into the L0 layer along a right-pointing arrow in a thick line in the L0 layer, on the basis of the "whole information amount of the record information" (e.g. 6 (GB)) of the present invention, such as the user data including the content information, and on the basis of the recording capacity of the L0 layer (4.7 (GB)) and the recording capacity of the L1 layer (4.7 (GB)), which are one example of the "first recording capacity" and the "second recording capacity" of the present invention, respectively. At the same time, a portion of the information amount (e.g. 3 (GB)) less than the recording capacity of the L1 layer is written into the L1 layer along a left-pointing arrow in a thick line in the L1 layer. In this manner, the turn-around point of the L0 layer (sector number "1AFFFFh") and the turn-around point of the L1 layer (sector number "E50000h") are calculated so that the recording can be performed, by 3 (GB), for example, in both the L0 layer and the L1 layer.

In particular, each of the turn-around points of the L0 layer and the L1 layer is a multiple of the ECC block, which is one example of the "predetermined recording unit" of the present invention. The predetermined recording unit herein is the ECC block or sector. More specifically, in the case where the compatibility of a ROM disc is emphasized, the information is recorded by each ECC block.

More concretely, in the L0 layer, the recording is performed only by 3 (GB) from the start position of the data area on the inner circumferential side (sector number: "030000h") to the turn-around point located on the outer circumferential side (sector number: "1AFFFFh"). Then, the optical pickup is focused on the L1 layer, and the recording is performed only by 3 (GB) from the turn-around point located on the outer circumferential side (sector number: "E50000h") to the end point of the data area on the inner circumferential side (sector number: "FCFFFFh") in the L1 layer. Then, lastly, the recording for the finalize process is performed in the middle areas 104-0 and 104-1 which are the buffer areas. Thus, the most outer circumferences of the L0 layer and the L1 layer are unrecorded areas 105-0 and 105-1.

Incidentally, immediately after the recording at the turn-around point of the L0 layer, the recording may be additionally performed in a small area of the middle area 104-0. On the other hand, immediately before the recording at the turn-around point of the L1 layer, the recording may be additionally performed in a small area of the middle area 104-1.

Alternatively, after the recording at the turn-around point of the L0 layer, the recording for the finalize process may be performed in the middle area 104-0 which is the buffer area. Alternatively, before the recording at the turn-around point of the L1 layer, the recording for the finalize process may be performed in the middle area 104-1 which is the buffer area.

In this manner, the recording time is only a time length for recording the record information, such as the content information, i.e., the effective information, which allows efficient reduction. In other words, it is no longer necessary to uselessly record the dummy data, such as "0" or "Null", for example, described later.

Thus, as compare to the case where the recording is performed in all the areas (4.7×2=9.4 (GB)) of the L0 layer and the L1 layer in a comparison example described later, it is possible to greatly reduce the recording time.

Specifically, a recording time by 1 time speed (1385 (KB/sec)) defined by DVD Forum is 6 (GB)÷1385 (KB/sec) =about 1 hour and 12 minutes, which allows reduction of about 37% (about 40 min) from the comparison example described later.

Incidentally, a detailed flow of recording operation of the information recording/reproducing apparatus in the example will be discussed later.

Next, with reference to FIG. 4 and FIG. 5, a study is made on the operation and the effect of the information recording/reproducing apparatus in the example of the information recording apparatus of the present invention. FIG. 4 is a schematic data structure diagram showing one specific example of the data structure of the two-layer type optical disc on which recording is performed by an information recording/reproducing apparatus in a comparison example. FIG. 5 is a schematic conceptual view showing routes when a general information recording/reproducing apparatus, such as a DVD-ROM drive, accesses a desired sector number on the two-layer type optical disc.

As shown in FIG. 4, in the comparison example, in the DAO recording method and the opposite method, if the user data including the content information or the like is recorded over the two layers of the L0 layer and the L1 layer, it is necessary to record not only the effective data, such as the user data, but also the useless data, such as the dummy data, for example, in an unrecorded area located on the inner circumferential side of the L1 layer. That is because a tracking servo in the layer focus jump (layer change) of the optical pickup is normally controlled at the time of reproduction operation of a general DVD-ROM drive, to thereby normally reproduce the user data. Therefore, an actual recording time increases, by a recording time of the useless data, in addition to a recording time of the effective data, such as the content information.

Specifically, if the user data including 6 (GB) of content information is recorded in the DAO recording method and the opposite method, the user data is recorded in the whole recording area of the L0 layer, i.e., an at most 4.7 GB recordable area, and the remaining user data which is not recorded in the L0 layer is recorded in a 1.3 GB recordable recording area of the L1 layer.

More concretely, in the L0 layer, the recording is performed only by 4.7 (GB) from the start position of the data area on the inner circumferential side (sector number: "030000h") to the turn-around point located on the outer circumferential side (sector number: "26FFFFh"). Then, the optical pickup is focused on the L1 layer, and the recording is performed only by 1.3 (GB) from the turn-around point located on the outer circumferential side (sector number: "D90000h") to the end point of the data area on the inner circumferential side (sector number: "E2FFFFh") in the L1 layer. Moreover, in the comparison example, in the L1 layer, only 3.4 (GB) of the dummy data, such as "0" or "Null", for example, is desirably recorded, from the start position of a lead-out area 103-1*a* (sector number: "E30000h") to the end position of the lead-out area 103-1*a* (sector number: "FCFFFFh"). This is because in the case where the dummy data is not recorded, for example, and the inner circumferential side of the L1 layer is unrecorded, if the optical pickup enters therein, the tracking servo is off and out of control. Specifically, in the case where the optical pickup of the DVD-ROM drive, for example, is focused on the L1 layer, namely, it performs the layer focus jump (layer change), in order to access a target sector number in the L1 layer (a "Y1" in FIG. 5) from a predetermined sector number in the L0 layer (an "X0" in FIG. 5), if the sector number in the L1 layer (a "Z1" in FIG. 5) which is a destination of the layer focus jump is unrecorded, the optical pickup cannot perform the control of tracking servo in a phase difference method, for example, and it goes out of control. More specifically, the optical pickup of a DVD-ROM reproduction-only drive which adopts the phase difference method can hardly or cannot control at all the tracking servo, with respect to an unrecorded area in a DVD-R which adopts a push-pull method. Note that this is also one example of the case where reproduction on the DVD-R cannot be performed by the DVD-ROM drive.

As described above, in the comparison example, although the user data is 6 (GB), it is necessary to perform the recording in all the areas of the L0 layer and the L1 layer (4.7×2=9.4 (GB)), and the recording time by 1 time speed, for example, is about 1 hour and 54 minutes, which is longer than 1 hour and 54 minutes based on the present invention by the amount of the dummy data to be recorded.

In contrast, according to the information recording/reproducing apparatus in the example of the information recording apparatus of the present invention, explained with reference to FIG. 1 to FIG. 3, it is possible to normally control the tracking servo of the optical pickup. At the same time, the recording time is only a time length for recording the effective data, such as the user data including the content information (about 1 hour and 12 minutes described above), which allows great reduction of the recording time, i.e., about 37% (about 40 min) of the recording time. Thus, it is extremely useful, as compared to the comparison example.

Incidentally, the general DVD-ROM drive allows the optical pickup to access the target sector number in two types of access routes, on the standard thereof. As shown in FIG. 5, the first one is an access route along the first route in which the layer focus jump is performed from the sector number "X0" in the L0 layer to the sector number "Z1" in the L1 layer, then, the L1 layer is scanned from the inner to the outer circumferential side, and then, the sector number "Y1" in the L1 layer is accessed. The second one is an access route along the second route in which it is scanned from the sector number "X0" in the L0 layer to a sector number "W0" in the L0 layer, then, the layer focus jump is performed, and then, the sector number "Y1" in the L1 layer is accessed.

(Flow of Recording Operation of Information Recording/Reproducing Apparatus—Drive Side—)

Next, with reference to FIG. 7, as occasion demands, in addition to FIG. 6, a detailed explanation will be given to a flow of the recording operation of the optical disc, on the information recording/reproducing apparatus, particularly or e.g., the drive, in the example of the information recording apparatus of the present invention. FIG. 6 is a flowchart showing a flow of the recording operation of the optical disc, on the information recording/reproducing apparatus, particularly or e.g., the drive, in the example of the information recording apparatus of the present invention. Incidentally, in FIG. 6, "X", "Y", and "Z" are all variables. FIG. 7 is a schematic diagram showing one specific example in which the sector number of the turn-around point is calculated by the information recording/reproducing apparatus in the example of the information recording apparatus of the present invention. Incidentally, in order to explain the calculation procedure of the turn-around point in an easy-to-understand way, a small data amount is taken as one specific example.

In FIG. 6, if the optical disc 100 is loaded, at first, a seek operation is performed by the optical pickup 352 under the control of the CPU 354, and it is judged whether or not it is a blank (unrecorded) disc on which the user data or the like is not recorded (step S101). Incidentally, at the same time of the judgment, various management information required for the recording process on the optical disc 100 may be obtained.

Here, if the optical disc 100 is the blank disc in the unrecorded condition (the step S101: Yes), moreover, it is judged whether or not a writing mode is a DAO recording mode (step S102). More specifically, a "MODE SELECT command" is issued from the host, to thereby set it to the DAO recording mode. On the other hand, the process is ended even if the information recording apparatus does not correspond to the DAO recording mode (the step S102: No). Here, if the writing mode is the DAO recording mode (the step S102: Yes), the data amount "X" (KB) of all the data transferred from the host to the drive is obtained, and is stored into the memory 355, for example (step S103). Namely, reserving the recording area to record therein all the data is requested. Specifically, a "RESERVE RZONE command" is issued from the host, by which the drive obtains the entire amount of data transferred from the host. More specifically, as shown in FIG. 7, it is stored in the memory 355 as the entire data amount "X"=65 (KB) (Kilo Bytes). Incidentally, the data with a less than 1 sector (=2 KB) data amount is transferred to the drive after the host performs embedding (padding) of the dummy data, such as "0" or "Null", up to the boundary of the sector unit, so that the actually recorded data amount "X" is 66 (KB).

Then, the number of ECC blocks "Y", necessary to record all the data in the step S103, is calculated (step S104). More specifically, as shown in FIG. 7, the number of ECC blocks "Y", necessary to record all the data in the step S103, is calculated as "Y"=Ceil ("X"÷32)=Ceil (66÷32)=Ceil (2.0625)=3, and is stored into the memory 355. Incidentally, the "Ceil" is a function of rounding up the fractional part of argument.

Then, the sector number "Z" of the turn-around point is calculated (step S105). More specifically, as shown in FIG. 7, the sector number "Z" of the turn-around point is calculated as "Z"=Ceil ("Y"÷2)×16+"30000h"=Ceil (3÷2)×16+"30000h"=2×16+"30000h"="30020h", and is stored into the memory 355.

Then, for example, the OPC process is performed for the L0 layer and the L1 layer, to thereby calculate the optimum recording laser power (step S106).

Then, the value of the optimum recording laser power based on the OPC process, control information or management information, or the like is recorded into a control data area or the like, for example, in the lead-in area 101-0 of the L0 layer (step S107).

Then, the user data, such as the content information, is recorded with the optimum recording laser power from the start position of the data area 102-0 in the L0 layer (step S108). Specifically, as shown in FIG. 7, the content information is recorded from the start position of the data area 102-0 in the L0 layer with a sector number of "30000h", for example.

Then, it is judged whether or not the address is reached to the sector number "Z" of the turn-around point (step S109). Specifically, as shown in FIG. 7, it is judged whether or not the address is reached to the turn-around point, which is the end position of the data area 102-0 in the L0 layer with a sector number of "30020h", for example.

Here, if the address is not reached to the sector number "Z" ("30020h") of the turn-around point (the step S109: No), the recording is continued in the data area in the L0 layer (step S110).

On the other hand, if the address is reached to the sector number "Z" ("30020h") of the turn-around point (the step S109: Yes), a small amount of dummy data is recorded into the middle area in the L0 layer, for example (step S111).

Then, the optical pickup is focused on the L1 layer from the L0 layer (step S112).

Then, a small amount of dummy data is recorded into the middle area in the L1 layer, for example (step S113). Incidentally, as a result of the judgment of the step S109, if the address is reached to the sector number "Z" of the turn-around point (the step S109: Yes), the above-mentioned steps S111 to S113 may be omitted, and the operational flow may go directly to a step S114 from the step S109.

Then, the user data, such as the content information, is recorded with the optimum recording laser power from the start position of the data area in the L1 layer (step S114). Specifically, as shown in FIG. 7, the content information is recorded from the turn-around point, which is the start position of the data area in the L1 layer with a sector number of "CFFDFh" which is the 15's complement number of the sector number of "30020h", for example.

Then, it is judged whether or not all the data is recorded (step S115). If all the data is not recorded (the step S115: No), the recording is continued in the data area in the L1 layer (step S116).

On the other hand, as a result of the judgment of the step S115, if all the data is recorded (the step S115: Yes), for example, the dummy data is recorded into the lead-out area in the L1 layer (step S117).

Then, as a process to satisfy the standard of the DVD-ROM, a process from a step S118 to a step S122 is performed.

At first, it is judged whether or not a position on the recording surface corresponding to the sector number of the turn-around point is on the inner circumferential side of a radius 34 mm from the center of the optical disc (step S118). If the turn-around point is on the inner circumferential side of the radius 34 mm (the step S118: Yes), for example, the dummy data is recorded from the turn-around point to a radial position at least with a radius of 35 mm, in the L0 layer and the L1 layer, resulting that the recorded area becomes the middle area (step S119).

On the other hand, as a result of the judgment of the step S118, if the position of the turn-around point is not on the inner circumferential side of the radius 34 mm from the center of the optical disc (the step S118: No), moreover, it is judged whether or not the turn-around point is located on the outer circumferential side of a radius 57.5 mm from the center of the optical disc and it is located on the inner circumferential side of a radius 58 mm (step S120). Here, if the turn-around point is not located on the outer circumferential side of the radius 57.5 mm from the center of the optical disc or it is not located on the inner circumferential side of the radius 58 mm (the step S120: No), that means that the turn-around point is located on the outer circumferential side of the radius 34 mm of the recording surface of the optical disc and it is located on the inner circumferential side of the radius 57.5 mm. Thus, for example, the dummy data is recorded only into an area at least with a width of 1 mm in the radial direction of the recording surface, from the turn-around point to the outer circumferential side, in the L0 layer and the L1 layer, resulting that the recorded area becomes the middle area (step S121).

Alternatively, if the turn-around point is located on the outer circumferential side of the radius 58 mm of the recording surface of the optical disc (the step S120: No), the minimum radial position of the recorded area is inevitably maintained.

On the other hand, as a result of the judgment of the step S120, if the turn-around point is located on the outer circumferential side of the radius 57.5 mm of the recording surface of the optical disc and it is located on the inner circumferential side of the radius 58 mm (the step S120: Yes), for example, the dummy data is recorded only into an area at least with a width of 0.5 mm in the radial direction of the recording surface, from the turn-around point to the outer circumferential side, in the L0 layer and the L1 layer, resulting that the recorded area becomes the middle area (step S122).

By virtue of the above-mentioned process, it is possible to satisfy the requirements for the standard of the DVD-ROM. More specifically, the standard of the DVD-ROM is that data information, such as the user data or the dummy data, for example, is recorded at least up to a diameter of 70 mm, i.e. a radius of 35 mm, on the recording surface of the optical disc.

On the other hand, if it is not the blank disc as a result of the judgment of the step S101 (the step S101: No), if the writing mode is not the DAO recording mode as a result of the judgment of the step S102 (the step S102: No), and after the process in the step S119, the step S121, and the step S122, a series of recording operation is ended.

(Flow of Recording Operation of Information Recording/Reproducing Apparatus—Host Side—)

Next, with reference to the above-mentioned FIG. 6, as occasion demands, in addition to FIG. 8, a detailed explanation will be given to a flow of the recording operation of the optical disc, on the information recording/reproducing apparatus, particularly or e.g., the host, in the example of the information recording apparatus of the present invention. FIG. 8 is a flowchart showing a flow of transfer operation of the optical disc, on the information recording/reproducing apparatus in the example of the information recording apparatus, particularly or e.g., the host, of the present invention. Incidentally, in FIG. 8, "X", "Y", and "Z" are all variables, as in the above-mentioned FIG. 6.

In FIG. 8, if the optical disc 100 is loaded, at first, a seek operation is performed by the optical pickup 352 under the control of the CPU 354, and it is judged whether or not it is a blank (unrecorded) disc on which the user data or the like is not recorded (step S201). More specifically, a "READ DISK INFORMATION command" is issued, to thereby perform the judgment. Incidentally, at the same time of the judgment, various management information required for the recording process on the optical disc 100 may be obtained. Here, if the optical disc 100 is the blank disc in the unrecorded condition (the step S201: Yes), the capacity information of the optical disc 100 is obtained (step S202). More specifically, a "READ CAPACITY command" is issued, to thereby perform the judgment.

Then, the writing mode of the drive is set to the DAO recording mode (step S203). More specifically, a "MODE SELECT command" is issued, to thereby set "Write type" of "Write parameters mode page" is set to "DAO".

Then, the data amount "X" (KB) of all the user data, such as the content information, is obtained by the host itself, and is stored into the memory 360, for example (step S204). More specifically, as in the above-mentioned step S103 in FIG. 6, the padding of the dummy data is performed, so that the actually recorded data amount "X" is 66 (KB).

Then, the number of ECC blocks "Y", necessary to record all the data in the step S204, is calculated (step S205). More specifically, in the same manner as the above-mentioned step S104 in FIG. 6, it is calculated as "Y"=Ceil ("X"÷32)=Ceil (66÷32)=Ceil (2.0625)=3, and is stored into the memory or the like.

Then, the relative sector number "Z" of the turn-around point is calculated (step S206). More specifically, by applying the above-mentioned step S105 in FIG. 6, the relative sector number "Z" of the turn-around point is calculated as "Z"=Ceil ("Y"÷2)×16=Ceil (3÷2)×16=2×16="00020h", and is stored into the memory 360 or the like. Incidentally, the absolute sector number of the turn-around point may be calculated by the drive.

Then, the host specifies the relative sector number "Z" of the turn-around point ("00020h") for the drive (step S207). More specifically, a control bit is added to a "RESERVE RZONE command", for example, and a "SET MIDDLE command" is issued from the host, to thereby perform the specification for the drive. Incidentally, the host can divide the data amount into two in an arbitrary proportion, without limited to two halves, for example, and the host can arbitrarily specify the sector number of the turn-around point for the drive.

Then, the drive is notified of the entire data amount transferred to the drive from the host (step S208). More specifically, a "RESERVE RZONE command" is issued, to thereby notify the drive.

Then, the user data is transferred to the drive (step S209). More specifically, a "WRITE command" is sequentially issued for each logical sector number (LSN), to thereby transfer the data. Incidentally, the drive is automatically focused on the L1 layer from the L0 layer at the time of recording at the absolute sector number of the turn-around point specified from the host, and the drive starts the recoding from the turn-around point in the L1 layer.

Then, it is judged whether or not the transfer of all the data is completed (step S210). Here, if the transfer of all the data is not completed (the step S211), the transfer of the data to the drive is continued (step S211).

On the other hand, if it is not the blank disc as a result of the judgment of the step S201 (the step S201: No), and if the transfer of all the data is completed as a result of the judgment of the step S210 (the step S210: Yes), a series of transfer operation is ended.

In the above-mentioned example, the information recording/reproducing apparatus for a write-once type optical disc, such as a two-layer type DVD-R, is explained as one specific example of the information recording apparatus. The present invention, however, can be also applied to an information recording/reproducing apparatus for a writable type optical disc, such as a two-layer type DVD-R/W, for example. In addition, it can be also applied to an information recording/reproducing apparatus for an optical disc of a multiple layer type, such as a three-layer type, for example. Moreover, it can be applied to an information recording/reproducing apparatus for a large-capacity recording medium, such as a Blu-ray disc.

The present invention is not limited to the above-described examples, and various changes may be made, if desired, without departing from the essence or spirit of the invention which can be read from the claims and the entire specification. An information recording apparatus and an information recording method, all of which involve such changes, are also intended to be within the technical scope of the present invention.

INDUSTRIAL APPLICABILITY

The information recording apparatus and the information recording method according to the present invention can be applied to a recorder or the like related to an optical disc of a multilayer type on which various information can be recorded at high density, for consumer use or for commercial use. Moreover, they can be applied to a recording apparatus or the like, which is mounted on various computer equipment for consumer use or for commercial use, or which can be connected to various computer equipment.

The invention claimed is:

1. An information recording apparatus for recording record information onto an information recording medium comprising: at least a first recoding layer having a first recording capacity; and a second recording layer having a second recording capacity, the first recording layer having a first buffer area for layer change and the second recording layer having a second buffer area for the layer change, said information recording apparatus comprising:

a writing device for writing the record information into the first recording layer and the second recording layer;

a calculating device for calculating a turn-around address when the record information is recorded continuously into the first recording layer and the second recording layer, on the basis of an entire information amount of the record information and the first and second recording capacities; and a controlling device for controlling said writing device (I-1) to write a first portion of the record information into the first recording layer up to the calculated turn-around address, (I-2) to write a first dummy data into a part of the first buffer area after the calculated turn-around address (II-1) to write a second dummy data into a part of the second buffer area before a corresponding address in the second recording layer which corresponds to the calculated turn-around address in the first recording layer and (II-2) to write a remaining second portion of the record information into the second recording layer from the corresponding address in the second recording layer.

2. The information recording apparatus according to claim 1, wherein said calculating device calculates the turnaround address such that an information amount of the second portion is equal to or less than an information amount of the first portion.

3. The information recording apparatus according to claim 1, wherein said writing device is constructed to write the record information by a predetermined recording unit, and said calculating device calculates the turn-around address such that each of the first portion and the second portion is a multiple of the predetermined recording unit.

4. The information recording apparatus according to claim 1, wherein said calculating device calculates the turn-around address only if the entire information amount of the record information is greater than the first recording capacity.

5. The information recording apparatus according to claim 1, wherein said information recording apparatus further comprises a communicating device, which is communicably connected to a host computer for providing the record information, and into which firmware logically constituting said calculating device is incorporated, and said writing device and said controlling device obtain the record information from the host computer through said communicating device.

6. An information recording method in an information recording apparatus comprising a writing device capable of writing record information into a first recording layer and a second recording layer on an information recording medium comprising: at least the first recording layer having a first recording capacity; and the second recording layer having a second recording capacity, the first recording layer having a first buffer area for layer change and the second recording layer having a second buffer area for the layer change, said information recording method comprising:

a calculating process of calculating a turn-around address when the record information is recorded continuously into the first recording layer and the second recording layer, on the basis of an entire information amount of the record information and the first and second recording capacities; and a controlling process of controlling said writing device (I-1) to write a first portion of the record information into the first recording layer up to the calculated turn-around address, (I-2) to write a first dummy data into a part of the first buffer area after the calculated turn-around address (II-1) to write a second dummy data into a part of the second buffer area before a corresponding address in the second recording layer which corresponds to the calculated turn-around address in the first recording layer, and (II-2) to write a remaining second portion of the record information into the second recording layer from the corresponding address in the second recording layer.

7. A computer-readable recording medium recording thereon a computer program executable by a computer provided in said information recording apparatus according to claim 1, to make the computer function as at least one portion of said writing device, said calculating device, and said controlling device.

8. An information recording apparatus for recording record information onto an information recording medium comprising: at least a first recording layer having a first buffer area for layer change; and a second recording layer having a second buffer area for the layer change, said information recording apparatus comprising:

a writing device for writing the record information into the first recording layer and the second recording layer;

a calculating device for calculating a turn-around address when the record information is recorded continuously into the first recording layer and the second recording layer, on the basis of an entire information amount of the record information; and a controlling device for controlling said writing device (I-1) to write a first portion of the record information into the first recording layer up to the calculated turn-around address, (I-2) to write a first dummy data into a part of the first buffer area after the calculated turn-around address, (II-1) to write a second dummy data into a part of the second buffer area before a corresponding address in the second recording layer which corresponds to the calculated turn-around address in the first recording layer, and (II-2) to write a second portion of the record information from the corresponding address.

* * * * *